April 5, 1949.　　　　C. T. DAVIS　　　　2,466,084
PEANUT HARVESTING DEVICE
Filed June 16, 1945　　　　3 Sheets-Sheet 1
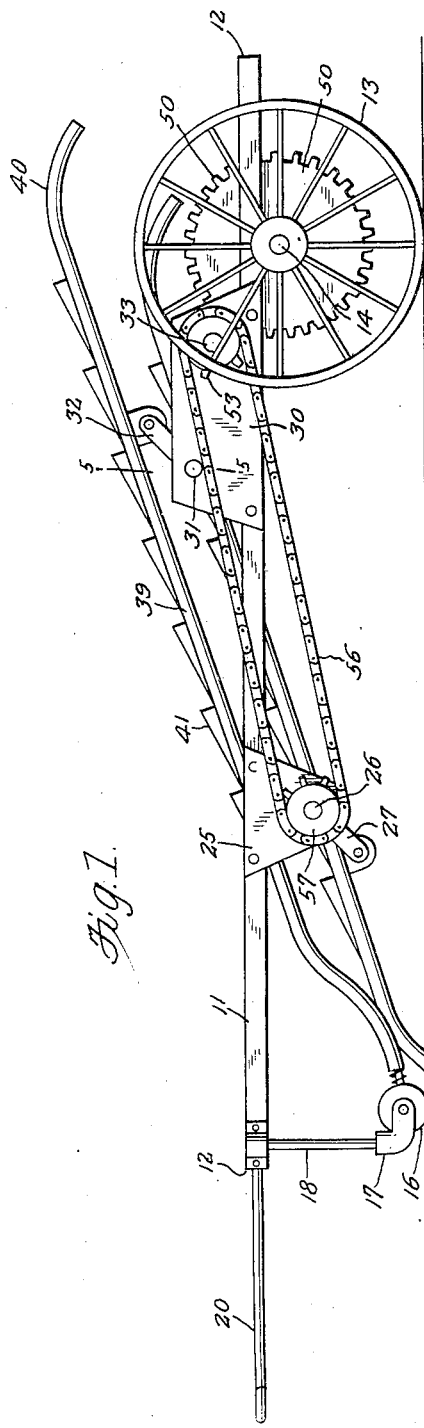
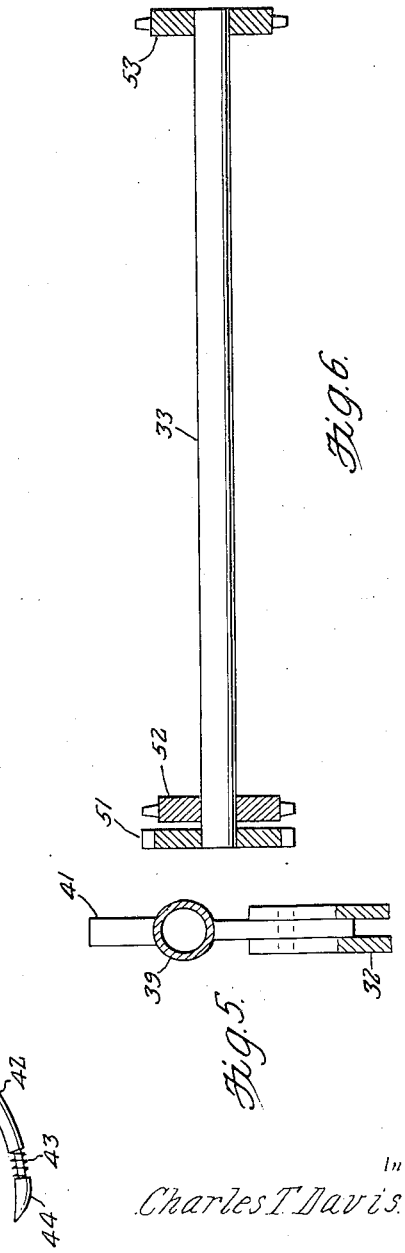
Inventor
Charles T. Davis
By Clarence A. O'Brien
and Harvey B. Jacobson
Attorneys April 5, 1949.　　　　C. T. DAVIS　　　　2,466,084
PEANUT HARVESTING DEVICE
Filed June 16, 1945　　　　3 Sheets-Sheet 2
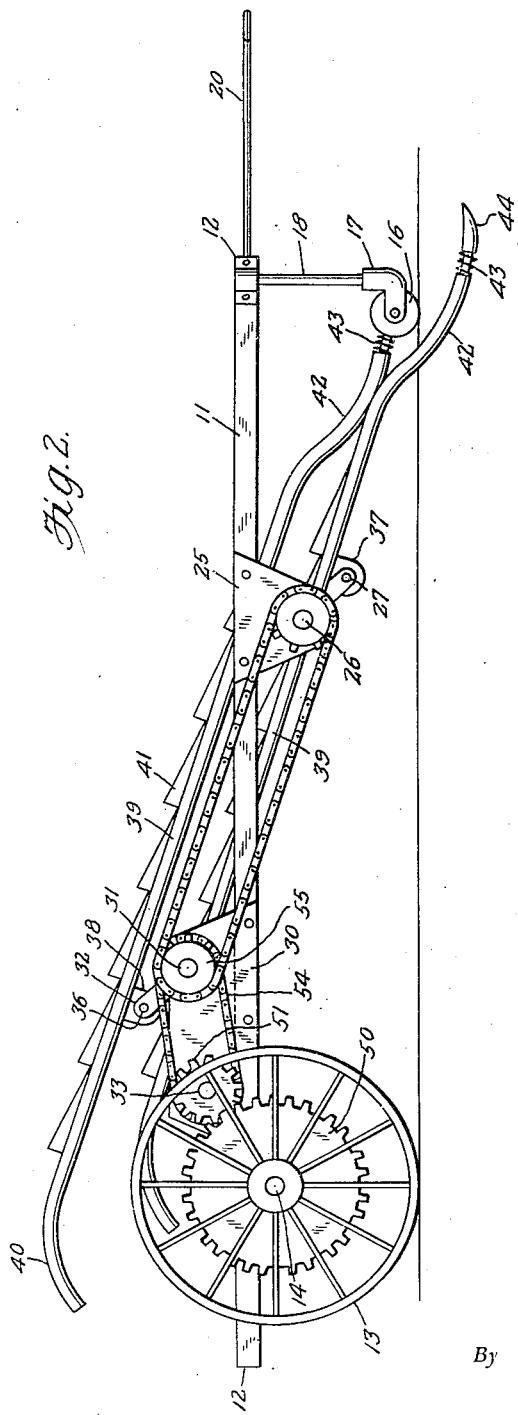
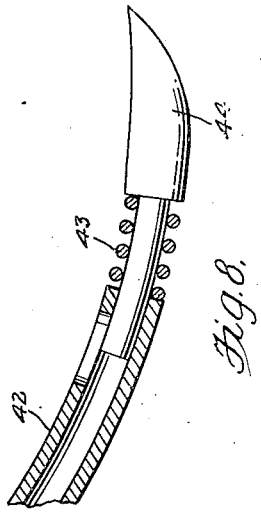
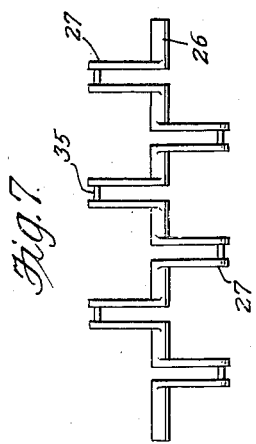
Inventor
Charles T. Davis.
By Clarence A. O'Brien
and Harvey B. Jacobson
Attorney April 5, 1949.   C. T. DAVIS   2,466,084
PEANUT HARVESTING DEVICE
Filed June 16, 1945   3 Sheets-Sheet 3
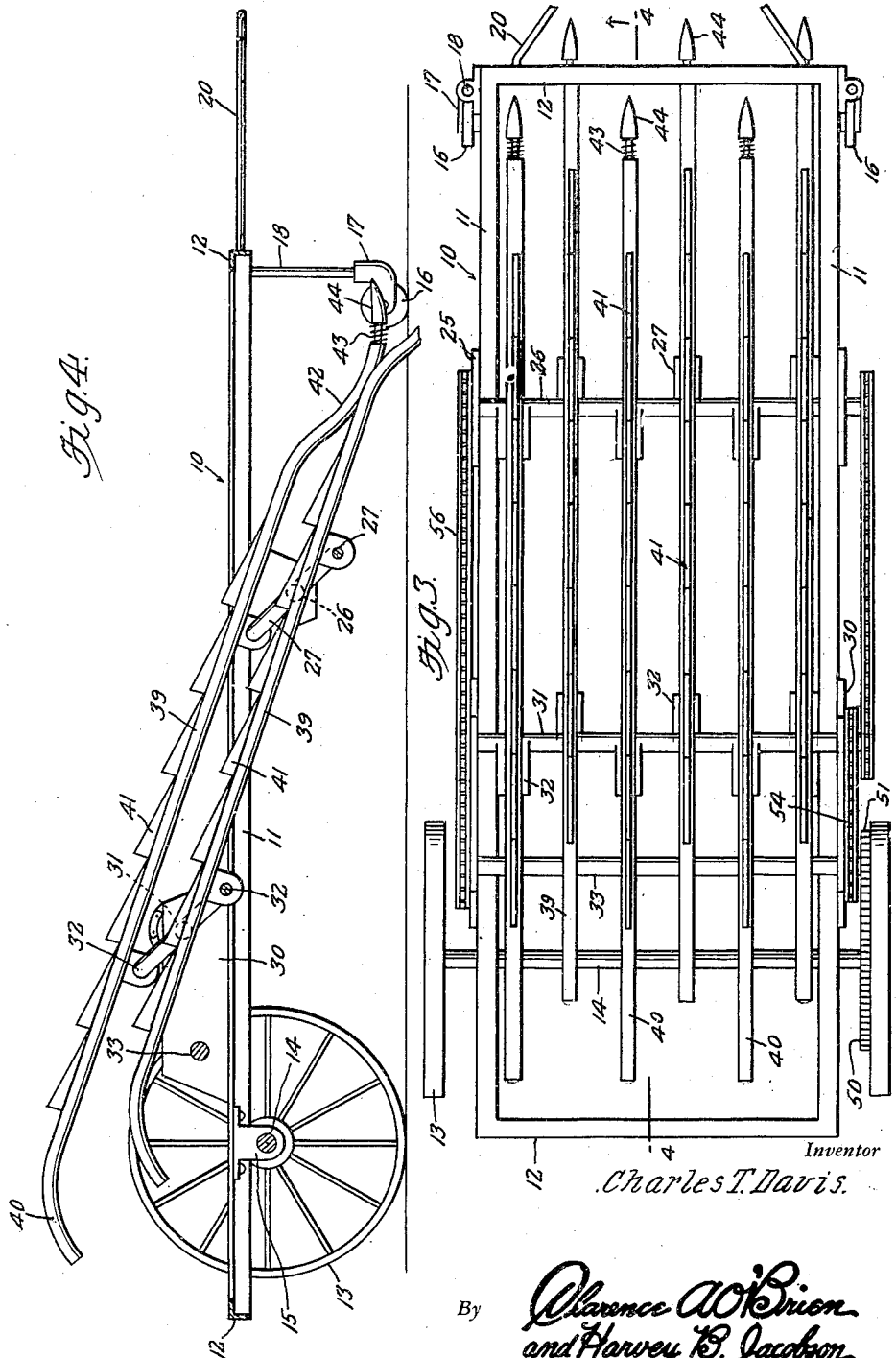
Inventor
Charles T. Davis.
By Clarence A. O'Brien
and Harvey B. Jacobson
Attorneys Patented Apr. 5, 1949

2,466,084

UNITED STATES PATENT OFFICE 2,466,084

PEANUT HARVESTING DEVICE

Charles T. Davis, Stockdale, Tex.

Application June 16, 1945, Serial No. 599,909

1 Claim. (Cl. 55—9)

This invention relates to a peanut harvesting device, and more particularly to such a device adapted for the shaking and shocking of peanut plants.

A primary object of this invention is the provision of an improved device adapted to agitate peanut plants to remove the earth therefrom, and convey the same to a suitable container or receptacle therefor.

An additional object of the invention is the provision of such a device which will simultaneously harvest a large number of rows of peanut plants or the like.

Still another object is the provision of such a device adapted to act automatically, when towed by any suitable means, such as a tractor or the like.

Other objects will in part be obvious and in part be pointed out hereinafter.

Still further objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a side elevational view of one form of device embodying the instant inventive concept.

Figure 2 is a view similar to Figure 1 showing the device as viewed from the opposite side.

Figure 3 is a top plan view of the device shown in Figures 1 and 2.

Figure 4 is a sectional view taken substantially along the line 4—4 of Figure 3, as viewed in the direction indicated by the arrows.

Figure 5 is a sectional view taken substantially along the line 5—5 of Figure 1.

Figure 6 is a sectional view of the main drive shaft, the axle being shown in elevation.

Figure 7 is a top plan view of one of the crank shafts, and

Figure 8 is an enlarged sectional view through a constructional detail comprising the plant lifting element.

Like reference numerals refer to like parts throughout the several views of the drawings.

Having reference now to the drawings, there is generally indicated at 10 a frame comprised of side pieces 11 connected at their extremities by tranversely extending end pieces 12. Frame 10 is supported by wheels 13 carried by an axle 14 journaled in suitable lugs 15 depending from the transverse members 11, and front wheels 16 positioned in swivelable sockets 17 carried by depending members 18 secured to the front portion of frame 10.

A drawbar 20 extends forwardly from the forward of members 12, and is adapted to be engaged by any suitable towing vehicle, such as a tractor or the like.

Positioned at an intermediate point in aligned relation, on each of members 11, are a pair of downwardly depending lugs 25, provided with apertures forming journals, between which extends a crankshaft 26 comprised of a plurality of oppositely disposed crank arms 27 (see Figures 3 and 4).

Positioned at a point adjacent the rear wheels, and secured to the longitudinally extending members 11 are a second pair of upstanding projections or lugs 30, extending between which and suitably journaled therein is a second crank shaft 31 provided with a plurality of crank arms oppositely disposed, 32. The lugs or projections 30 also have journaled therein a jack shaft 33.

Each of the crank shafts 27 and 32 has a transversely extending pin 35 and 36, respectively, positioned between the bifurcated arms thereof, which pins engage respectively in lugs 37 and 38 depending at spaced points from tubular members 39. The tubular members 39 comprise the lifting elements of the device, and are each provided with a downwardly depending rear extremity 40, and a plurality of serrations or teeth 41 extending longitudinally therealong. At their lower extremities each of the members 39 is provided with a downwardly depending arcuate portion 42, to the extremity of which a compression spring 43 terminating in a suitable digging point 44 comprised of wood or the like (see Figure 8). The arrangement is such that the members are oppositely disposed with respect to the crank arms 27 and 32 in such manner that alternate members 39 are depressed to and slightly below the ground level, while the remaining alternate members are raised simultaneously. In the illustrative embodiment of the invention shown there are six of these members, or three oppositely disposed pairs, but it will be understood that the frame 10 may be made of any desired dimensions to accommodate as many rods 39 and their corresponding digging points 44 as may be desirable or advantageous.

From the foregoing it will now be seen that when the crank shafts 27 and 32 are rotated, in a manner to be more fully described hereinafter, that alternate members 39 dig into the earth slightly and raise therefrom with a reciprocatory movement, the teeth 41 guide the peanut plants or the like therealong, alternately forcing them upwardly along the members until they reach the depending ends 40, from which they are passed to any suitable trailing vehicle or the like, adapted for the reception thereof.

Referring back now to the rear axle or main axle 14 the same is provided, as best shown in Figures 1 and 2, with a relatively large gear wheel 50 secured adjacent one extremity thereof. The gear 50 is adapted to mesh with and engage a reduction gear 51 mounted on the jack shaft 33 thus rotating the same as the rear wheels 13 are rotated by the forward motion of the device.

The jack shaft 31 also carries at opposite extremities thereof, one being positioned interiorly of the gear 51, sprocket wheels 52 and 53, respectively. The sprocket wheel 52 is adapted to engage a chain 54 which, in turn, engages a sprocket wheel 55 carried by the crank shaft 31. The sprocket wheel 53 on the opposite end of the shaft is engaged by a chain 56 which, in turn, drives a sprocket wheel 57 carried by the eccentric shaft 26.

Thus from the foregoing it will be seen that as the wheels 13 revolve the gear 50 is, in turn, revolved rotating the gear 51 which drives the shaft 33, and that by means of the sprockets 52 and 53 and the chains 54 and 56, the eccentric shafts 31 and 26 are correspondingly rotated, thus affecting the reciprocatory movements of the alternately disposed members 39, and their associated digging points 44.

Thus from the foregoing it will be seen that as the device moves forwardly alternate points 44 dig slightly into the ground, and lift the peanut plants, which, in turn, are carried by the teeth 41 back upwardly along the members 39 and finally dropped by the extremities 40 into the receptacle provided therefor. It will also be seen that the reciprocatory movement of the members 39 thoroughly shakes and shocks the plants during their passage thereover.

From the foregoing it will now be seen that there is herein provided a device accomplishing all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a device of the character described, in combination, a frame, drive wheels for said frame, a pair of shafts carried by said frame, crank arms mounted on said shafts, longitudinally extending hollow members alternately secured to said crank arms, lifting means at the extremities of said members, and means driven by said drive wheels for rotating said shafts hence reciprocating said members, said reciprocating members being provided on their upper surfaces with angularly disposed serrations, said lifting means including lifters having stub shafts secured thereto, springs encircling each stub shaft and abutting said members for resiliently mounting said lifters, slots in said members, pins on said stub shafts slidably received in said slots.

CHARLES T. DAVIS.

REFERENCES CITED

The following references are of record in the file of this patent:

UNITED STATES PATENTS

| Number | Name | Date |
|---|---|---|
| 1,479,385 | Hurst | Jan. 1, 1924 |
| 2,297,065 | McLendon | Sept. 29, 1942 |

FOREIGN PATENTS

| Number | Country | Date |
|---|---|---|
| 122,256 | Great Britain | Jan. 21, 1919 |
| 327,806 | Italy | July 18, 1935 |

OTHER REFERENCES

Reed, "Developments in Peanut Harvesting Equipment," Agr. Eng., vol. 25, No. 4 (Apr. 1944), pp. 125, 126, 128.